April 1, 1941.   E. G. SHOWER   2,236,977
TESTING OF ELECTRONIC DISCHARGE DEVICES
Filed Jan. 26, 1940

INVENTOR
E.G. SHOWER
BY
Walter C. Kiesel
ATTORNEY

Patented Apr. 1, 1941

2,236,977

UNITED STATES PATENT OFFICE 2,236,977

TESTING OF ELECTRONIC DISCHARGE DEVICES

Edmund G. Shower, Freeport, N. Y., assignor to Bell Telephone Laboratories, Incorporated, New York, N. Y., a corporation of New York Application January 26, 1940, Serial No. 315,685

15 Claims. (Cl. 250—27)

This invention relates to testing arrangements for electronic discharge devices and particularly for testing the operating efficiency of such devices.

The efficiency of an electronic device employed in radio transmitting and receiving systems and in fact in all electrical translating or related systems and the probable service operating life of the device may be determined by the total electron emission characteristic of the active cathode of the device.

When direct, steady-state measurements of the total emission are made on such devices, the high energy dissipated in the cooperating electrodes associated with the cathode causes considerable damage and permanently changes the characteristics of the cathode. This procedure is overcome by making the measurements at low cathode temperatures where the deleterious effects mentioned above do not occur and then extrapolating the data to determine the condition at the rated cathode temperature.

An object of this invention is to facilitate the measurements of total emission of the cathode at the operating temperature of the cathode in order to obtain a true indication of the efficiency of the device.

A further object of the invention is to enable direct determination of the emission characteristic of the device whereby greater aid will be secured in the design of discharge devices and the length of useful operating life of the device may be more accurately predicted.

In accordance with one aspect of this invention, a supply source capable of generating voltages up to and exceeding the saturation voltage of the electronic device to be tested is applied to a storing element which is discharged through the interelectrode impedance of the device. With no impedance in this arrangement the peak value of this discharge would be infinite. However, the space current which can flow in the device is very definitely limited to the total emission of the cathode. It therefore remains to measure the peak current. The total space current is impressed on a resistance element in the output circuit of the device under test and the current passing through the resistance establishes a voltage drop commensurate with the peak current in the device. This is impressed across a gaseous rectifier device which in turn charges a storing element in its output circuit. The charge on the second storing element is then transferred to a suitable recording device which indicates the proportional value of the emission of the cathode of the device under test.

In a specific embodiment of a typical form of the invention, a source of voltage sufficient for saturation of the electronic device to be tested is connected through switching apparatus to a condenser element which is charged through a resistance to ground. The peak voltage of the condenser is then discharged through the anode and grid of the device under test and the resistance in the condenser circuit by suitable switching apparatus, the cathode of the device being supplied with energizing current in order to maintain the temperature of the cathode at a normal operating value. Since the space current flowing through the tested device under these conditions is definitely limited to the total emission of the cathode, provided the voltage applied is sufficient to attain temperature saturation, it is evident that the peak current impressed across the resistance in the condenser circuit produces a voltage drop proportional to the total emission of the device. It therefore remains to measure the peak current with minimum loss to determine the total emission of the cathode of the device under test. This is accomplished by impressing the resultant current on a gaseous unidirectional device to charge an associate condenser in series therewith. A switch connected to the latter condenser permits the discharge to be applied to an indicating device, such as a ballistic meter, which gives a deflection proportional to the voltage of the condenser. The total emission current is then calculated from the value of the resistance in the measuring circuit. This produces a rapid and accurate measurement of the total emission of the device being tested under operating conditions and facilitates the determination of the current output limit and theoretical operating life of electronic discharge devices.

A feature of this invention relates to a substitution of the recording meter with a visual indicator to register approximate values of total emission of the devices under test. This is accomplished by a series or bank of gaseous conduction or trigger devices of the three electrode type having their control elements connected in parallel relation with the condenser of the measuring circuit above described, and their anode elements supplied with increasing positive potential whereby the trigger devices are actuated when a critical voltage is impressed on the control elements thereof so that a selective action is secured to indicate the approximate value of the total emission. This results in a rapid test to give approximate indicia of the devices under test, such, for instance, as whether the device establishes total emission within a definite and limited range of values.

These embodiments and other features of the invention will be understood more clearly by referring to the following detailed description taken in connection with the accompanying drawing.

Figure 1:
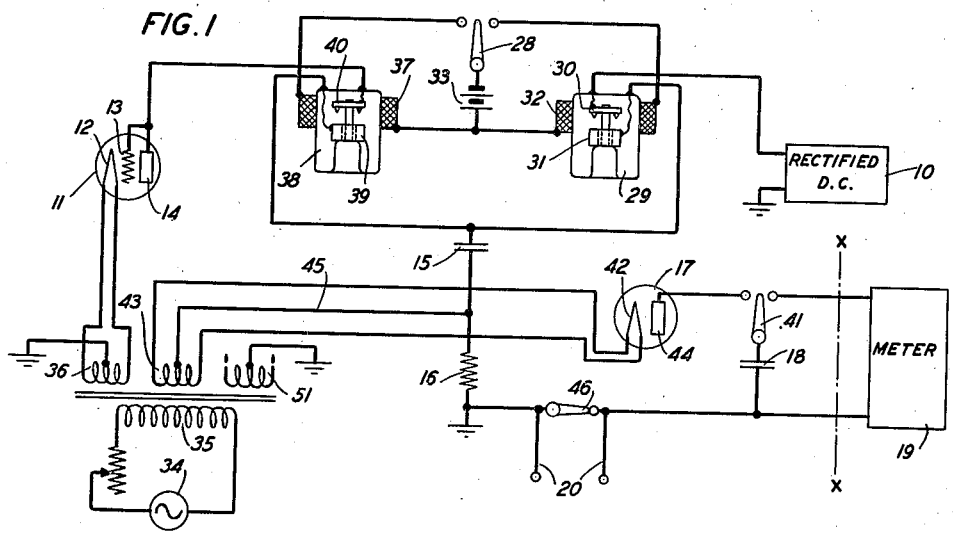
Fig. 1 is a diagrammatic view of one form of the invention and shows the essential elements of the circuit for determining the test conditions.

Referring to the drawing and Fig. 1 specifically, the measuring circuit of this invention embodies a suitable high voltage source 10, shown diagrammatically in block form, which represents a rectified direct current voltage, of the order of 1000 volts, although higher or lower voltage sources may be used depending upon the type of electronic device which is to be tested for total emission characteristics. The device in which the emission is to be measured is shown at 11, and comprises, for illustration, a three electrode device of the amplifier type having a filament 12, a control electrode or grid element 13 and an anode or plate 14. The device 11 may be a high voltage amplifier of the water-cooled type having a tungsten filament as the electron emitting source or it may be of the low voltage type used in radio receivers having an oxide coated filament or an indirectly heated cathode or a thoriated filament as the emitter. Regardless of the type of emitter employed in the device, the measurement of the total emission and therefore the efficiency of the device may be ascertained in accordance with this invention when suitable auxiliary elements are provided in the testing circuit for accomplishing the desired results.

These elements include a primary storing component or high voltage condenser 15, an impedance component 16, a gaseous unidirectional device 17 and a cooperating secondary storing component or low voltage condenser 18 bridged across the impedance. A suitable current meter 19, preferably of the ballistic type, is provided in the output of the test circuit to indicate and measure the resultant current stored in the secondary component 18, although other indicating apparatus may be used instead of the ballistic meter, such as a milliammeter, galvanometer or vacuum tube voltmeter. The meter may be calibrated by inserting a known voltage source in the by-pass circuit 20 for different values of the impedance component 16. The deflection of the meter is therefore a measure of the voltage applied to the gaseous discharge device 17 and storing element 18. Since the value of the impedance 16 is known, the meter deflection can be calculated to obtain the total peak current of the device under test. One representative set of elements for the arrangement shown would include a 1 microfarad condenser (15), a 10 ohm resistance (16), a mercury vapor hot cathode rectifier having a low voltage drop for the device 17, and a 0.1 microfarad condenser (18).

Figure 2:
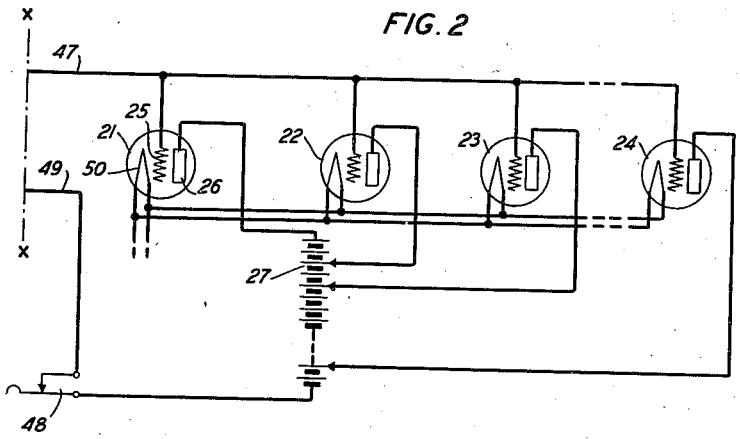
Fig. 2 shows a modified arrangement of the indicating apparatus to be substituted for the meter of Fig. 1 to selectively identify the emission range of the device under test.

In a modification of the invention an arrangement of multiple gaseous trigger devices, as shown in Fig. 2, may be substituted for the ballistic meter 19 to obtain a visual signal determination indicating approximate peak emission values for different devices to be tested. In this arrangement the trigger devices 21, 22, 23 and 24 each have a control electrode or grid 25 connected directly and in parallel to one side of the measuring circuit and the successive anodes or plates 26 are connected to a potential source, such as a battery 26, which is connected to the other side of the measuring circuit. If the range of total emission is between maximum and minimum values of 10 to 0.5 milliamperes, each trigger device will be ignited when a given voltage is impressed on the control electrode 25. This is accomplished through the critical biasing potentials of the devices whereby a predetermined positive potential will selectively ignite one of the trigger devices to indicate the value of the peak voltage impressed thereon. This arrangement affords a speedy and quantitative emission test of discharge devices and is highly efficient in mass production and routine life testing of electronic devices.

The testing circuit of this invention may be utilized for a large variety of devices such as high voltage water-cooled devices employing tungsten filaments as an emission source, devices having thoriated filaments and discharge devices of the dull emitter type, such as oxide coated cathodes and cold cathode electronic devices. The testing requirements for these various types of devices are naturally dependent on the saturation, output and other characteristics of the devices so that alterations in the circuit should be made for the different types of devices. These changes involve the values of the voltage source impressed on the device and the constants of the storing components and impedance in the measuring circuit suitable for the particular type of device to be tested.

The detailed operation of the testing circuit will now be described. The initial step, in accordance with this invention, is the charging of the storing component or condenser 15 from the rectified source of voltage 10 through the operation of switch 28 to the right-hand contact. The full saturating voltage from the source 10 is impressed on the condenser and the resistance 15 to ground. Since the source 10 may be of large magnitude, i. e., 3000 volts or more, it is desirable for safety conditions to facilitate the switching of such high voltages in vacuum and this is accomplished through the interposition of a vacuum type magnetic relay or switch 29, such as disclosed in U. S. Patent 1,998,822, issued April 23, 1935, to V. L. Ronci and E. F. Elbert. The vacuum relay or switch is provided with a stationary contact 30 and a movable contact 31 which is actuated by an external energizing coil 32. The coil is connected to a low voltage source or battery 33 and the switch 28 to close the contacts of the relay to cause the high voltage source to charge the condenser 15. In this manner the safety of the operator is insured since the operation of the switch 28 avoids direct coupling with the high voltage source 10. Furthermore, the operation of the contacts 30 and 31 in vacuum substantially reduces arcing and destruction of the contacts at the elevated temperatures incident to high voltage switching manipulation.

The electronic device 11 to be tested for total emission current may be, for example, a large power amplifier of the water-cooled type having a tungsten filament 12 energized by alternating current from a source 34 which is connected to a primary winding 35 of a transformer and having a secondary winding 36 connected to the filament 12 which is provided with a mid-point tap to ground. The energizing voltage supplied to the filament is from 20 to 22 volts and the normal emission current is of the order of 7 to 10 amperes. Therefore, the voltage source 10, for the purposes of the test, should be of a high order and at least equal to the saturation voltage of the device to be tested. Assuming this source is adequate and the condenser 15 has been charged to the voltage of the source 10 through the relay 29, the movement of the switch 28 to the left will energize a coil 37 of a vacuum relay 38, similar to relay 29, to operate the contacts 39 and 40 and thereby discharge the condenser 15 to the anode or output element 14 of the device under test. In performing the testing operation in a device having more than two elements such as an amplifier or other multi-element devices, it is desirable to couple the other elements, such as a grid 13 to the anode to avoid stray losses of electrons within the vessel of the device and thereby facilitate accurate measurement of the total emission of the filament.

The short time that the high potential is impressed on the anode of the device, due to the discharge of condenser 15, is not detrimental to the electrodes of the device being tested since the total energy applied is sufficintly low to prevent overheating and thereby avoid changes in the characteristics of the device. Nevertheless, the peak voltage causes a space current to flow through the device under test and since the space current is limited to the total emission of the filament in the device, it remains to measure the peak current produced at the saturation point of the filament.

The resultant space current flows through the now inductive resistance 16 and establishes a voltage drop across it which is impressed on the gaseous unidirectional device 17 and auxiliary condener 18 through switch 41 being moved to the left-hand position. The gaseous device 17 is an envelope containing mercury vapor, a cathode 42 energized by a secodary winding 43 of the transformer associated with the supply source 34 and an anode 44. The cathode of the gaseous device is connected to one side of the resistance 16 through a mid-point tap of the seconary winding 43 by a wire 45 while the anode 44 is connected to the other side of the resistance through switch 41, condenser 18, and switch 46.

If the switch 41 is in the left-hand position when the main condenser 15 is discharged through the device under test, current will flow through the unidirectional device 17 to charge auxiliary condenser 18 to a voltage equal to the peak value of the voltage developed across the resistance 16. When condenser 18 is fully charged the switch 41 may be moved to the right-hand position for impressing the charge of condenser 18 on the meter 19 which gives a deflection proportional to the voltage on condenser 18 and hence proportional to the emission current of the discharge device under test. The measuring circuit may be calibrated by opening the switch 46 and inserting a battery of known voltage across the terminal 20. The deflection of the meter 19 for a given set of voltages applied to the unidirectional device 17 and the condenser 18 in series will represent a calibration curve for comparison with the emission deflection indicated on the meter. Then knowing the value of the resistance 16 the emission current is easily calculated.

This method is rapid and its accuracy far exceeds the former extrapolation process of measurement of total emission of electronic discharge devices. Furthermore, the utility of this invention lies in its ability to replace arbitrary measurements of the behavior of the electronic devices by accurate measurements having a more direct correlation with fundamental physical characteristics of the device being tested. The total emission characteristic obtained in accordance with this invention furnishes important data for calculating the temperature of the cathode of the device under test and hence the theoretical operating life of the device. These data are also important from a circuit design standpoint since the emission is a factor which limits the power output of the device at the peak of the alternating current wave of anode voltage.

The substitute indicating arrangement shown in Fig. 2 which is used in place of the meter of Fig. 1 provides an instantaneous signal for identifying the emission value of the device under test. In this arrangement a bank of gaseous trigger devices 21 to 24 are connected in parallel across the output of the test circuilt with the grids 25 coupled to a line 47 which may be joined to the right-hand contact of switch 41 and each anode 26 is connected to a positive terminal of successively decreasing potential on battery 27. The negative terminal of battery 27 is connected to a switch 48 and line 49 which may be joined to the lower plate of condenser 18. The filaments 50 of the trigger devices are connected in multiple across a secondary winding 51 of the transformer of Fig. 1, the mid-point thereof being grounded.

The biasing potentials on the anodes of the trigger devices provides a decreasing scale or range of values for indicating the maximum and minimum predetermined limits within which electron discharge devices of the same or different types may be tested. For example, if the trigger devices are biased so that device 21 is ignited by a positive potential of 100 volts on the grid 25, it will indicate that the device being tested has the maximum total emission which may be designated as 10 amperes or 10 milliamperes depending on the type of device under test. If the voltage across condenser 18 is less than the above amount, the trigger device 21 will not operate but one of the succeeding devices 22 to 24 will be ignited when a potential on the respective grid electrode is critical with respect to the biasing potential. As each trigger device is ignited, the control of the discharge is assumed by the grid electrode. In order to extinguish the discharge and transfer the control back to the anode, the switch 48 is provided to disrupt the discharge path. If a minimum voltage is stored in condenser 18 as a result of the test on a discharge device, then the potential impressed on the grid of trigger device 24 will selectively ignite the discharge path in this device to indicate the low value of the total emission which may be 0.5 ampere or 0.5 milliampere. Under this condition the preceding trigger devices will not be actuated due to their higher biasing potentials. In a similar manner, if trigger device 22 is biased to be ignited by a potential which represents 5 amperes or 5 milliamperes and the device being tested has an emission of 7 amperes or 7 milliamperes, the trigger device 22 will operate to the exclusion of the trigger device 21 to indicate that the total emission is at least 5 amperes or 5 milliamperes. The bank of trigger devices may be enlarged to any extent in order to achieve the desired range of values for particular conditions of testing and is merely illustrative to point out the phases of the invention in which it may be applied.

In a similar manner various changes may be made in the components of the main testing and measuring circuit to facilitate the results of the test. For instance, the resistance and condensers may be varied for different devices under test. Similarly, other indicating apparatus may be employed instead of the ballistic meter 19 to determine the total emission of the devices under test. These and other suitable changes are assumed to be within the scope of the invention as defined in the appended claims.

What is claimed is:

1. A measuring circuit for testing the emission efficiency of an electron discharge device having a cathode and an anode, comprising a storing element, a gaseous control device, an impedance connecting said element to said gaseous device, means to charge said storing element, switching means for discharging said storing element to the anode of said device under test, whereby the resultant current is impressed across said impedance to operate said gaseous device, means for charging a second storing element from said gaseous device, an indicating means, and means for impressing the charge on said second element on said indicating means.

2. A testing circuit for indicating the emission efficiency of an electronic discharge device having an electron emitter and an anode, which comprises a supply source, a storing means, means for impressing peak energy from said source on said storing means, means for discharging said storing means to establish saturation current between said emitter and said anode and produce peak electron emission from said emitter, a resistance in which the resultant current produces a voltage drop commensurate therewith, a gaseous unidirectional device and an auxiliary storing means connected across said resistance and adapted to be energized by the voltage across said resistance, an indicating means, and switching means for discharging said auxiliary storing means through said indicating means to record the total emission produced by the device under test.

3. A test circuit for determining the total electron emission produced by a discharge device having an electronic emitter and other cooperating electrodes, comprising a high voltage supply source, a capacity element and a resistance in series, switching means for impressing said voltage source on said element, means for discharging said element through said device and resistance to establish saturation conditions between said emitter and said electrodes and produce a voltage drop across said resistance commensurate with the total emission from said emitter, a gaseous rectifier device and a second capacity element connected to said resistance, means for charging said second element through said rectifier substantially equal to the voltage drop across said resistance, a deflection meter, and means for transferring the charge on said second element to said meter.

4. A test circuit for determining the total emission produced by a discharge device having an electronic emitter and other cooperating electrodes, comprising a high voltage supply source, a high voltage capacitance, switching means for impressing said source on said capacitance, a resistance element connected to said capacitance and the device to be tested, means for discharging said capacitance through said device to establish a voltage drop across said resistance equivalent to the peak current flowing through said device, a gaseous rectifying device and a low voltage capacitance connected to said resistance, an indicating means, and switching means for alternately connecting said low voltage capacitance to said rectifying device and to said indicating means.

5. An emission test circuit for determining the total electron emission produced by a discharge device having an electronic emitter and other cooperating electrodes, comprising a high voltage supply source, a capacity element and a resistance in series, switching means for impressing said voltage source on said element, means for discharging said element through said device and resistance to establish saturation conditions between said emitter and said electrodes and produce a voltage drop across said resistance commensurate with the total emission from said emitter, a gaseous rectifier device and a second capacity element connected to said resistance, means for charging said second element through said rectifier substantially equal to the voltage drop across said resistance, a ballistic meter, and means for transferring the charge on said second element to said meter.

6. An emission measuring circuit for an electronic discharge device having an electron emitter and associated electrodes, comprising a high voltage source of potential capable of supplying saturation energy for said device, a high voltage condenser, switching means for charging and discharging said condenser, means to selectively operate said switching means, the high voltage being impressed on the associated electrodes of said device to produce a peak space current commensurate with the total emission of said emitter, a resistance element, means for passing the space current through said resistance to establish a voltage drop therein, a gaseous unidirectional device having a cathode connected to one side of said resistance and an anode, a low voltage condenser connected to the other side of said resistance, means interposed between said anode and low voltage condenser for charging said low voltage condenser through said gaseous device from the voltage across said resistance, and ballistic indicating means connected to said low voltage condenser for receiving the discharge of said condenser, the deflection of said ballistic means being proportional to the voltage released from said low voltage condenser and hence proportional to the emission current of the device under test.

7. A test set for determining the total electron emission derived from a cathode of an electronic discharge device, which comprises means for energizing said cathode at normal operating temperature, a potential source capable of supplying saturation energy to said device, a high voltage condenser and a resistance in series relation, means for charging said condenser from said source and discharging said condenser through said device under test, the resultant peak current flow in said device establishing a voltage drop across said resistance equal to the total emission of said cathode which is limited to the peak current, a gaseous unidirectional device and a low voltage condenser connected across said resistance, means between said gaseous device and low voltage condenser for completing the conductive path through said resistance to charge said low voltage condenser through said unidirectional device to substantially the same voltage established across said resistance, an indicator connected to said condenser, and means connected with said indicator for discharging said condenser through said indicator to register the total emission current produced in the device being tested.

8. An emission measuring set for an electronic discharge device having an electron emitter and other cooperating electrodes, comprising a high voltage source, means for energizing said emitter at normal operating temperature, a high voltage low capacity condenser, switching means for charging said condenser from said source and discharging said condenser through said cooperating electrodes of the device under test to establish the peak current characteristic commensurate with the total electron emission of said emitter, a non-inductive resistance connected to said device under test, said peak current producing a voltage drop across said resistance comparable to the emission current, an output circuit connected to said resistance including a unidirectional gaseous conduction device, a low voltage condenser having a fractional capacity of said high voltage condenser, switching means for initiating a discharge in said gaseous conduction device whereby said low voltage condenser is charged to a voltage substantially equal to the voltage drop across said resistance, a deflection type meter connected to said condenser, and switching means whereby said condenser is discharged through said meter to indicate the proportional value of the total emission of the device under test.

9. The method of measuring the electron emission of a cathode of an electron discharge device which comprises, impressing a saturation voltage on said device, impressing the resultant peak current across the discharge gap of a gaseous discharge device, storing the output of said gaseous device, and transferring the stored current to a recording meter to indicate the proportional emission value of said cathode.

10. A method of measuring the total electron emission of an emitter in an electronic discharge device which comprises, energizing the emitter to normal operating temperature, applying a high frequency saturating voltage to said device momentarily to develop maximum space current therein, said space current establishing a voltage drop in the output circuit of said device, applying said voltage drop to a gaseous unidirectional device having an output circuit including a capacitance which is charged to the full voltage drop, and discharging said capacitance through a registering meter to indicate the total emission produced by the device under test.

11. The method of measuring the total emission of a cathode of an electronic discharge device which comprises, charging a condenser with a saturation voltage, discharging said condenser through said device to develop a peak space current, producing a voltage drop in the output of said device, applying said voltage drop to a gaseous device timing circuit, charging a condenser in said timing circuit, and discharging said latter condenser through a current meter.

12. An emission test circuit for determining the total electron emission produced by a discharge device having an electronic emitter and other cooperating electrodes, comprising a high voltage supply source, a high voltage capacitance, switching means for impressing said source on said capacitance, a resistance element connected with said capacitance and the device to be tested, means for discharging said capacitance through said device to establish a voltage drop across said resistance equivalent to the peak current flowing through said device, a gaseous rectifying device and a low voltage capacitance connected to said resistance, a bank of individual gaseous conduction devices each having a cathode, a control electrode and an anode, means for connecting the control electrodes of said devices in multiple relation, means for applying biasing potentials to the anodes of said devices of successively varying value, and switching means to discharge said low voltage capacitance through the grids of said gaseous conduction devices to selectively ignite one of said devices to indicate the emission value of the device being tested.

13. An emission test circuit for determining the total electron emission produced by a discharge device having an electronic emitter and other cooperating electrodes, comprising a high voltage supply source, a high voltage capacitance, switching means for impressing said source on said capacitance, a resistance element connected with said capacitance and the device to be tested, means for discharging said capacitance through said device to establish a voltage drop across said resistance equivalent to the peak current flowing through said device, a gaseous rectifying device and a low voltage capacitance connected to said resistance, a bank of individual gaseous conduction devices, each having a cathode, a control electrode, and an anode, means for connecting the control electrodes of said devices in multiple relation, a source of energy for said devices, means for connecting the anodes of said devices successively to points of decreasing voltage on said source, switching means for discharging said low voltage capacitance to the grids of said devices, the potential impressed on said grids being critical with the anode voltages of the respective devices to selectively flash one of said devices and transfer control of the discharge from the anode of the flashed device to the grid thereof, and means for extinguishing the discharge and reverting control of the discharge to the anode of the flashed device.

14. A method of measuring the total emission of a cathode of an electronic discharge device which comprises, impressing a saturation voltage on said device, producing a voltage drop in the output of said device commensurate with the peak current developed in said device, initiating a discharge in the gap of a gaseous conduction device, storing the output thereof, discharging the stored energy, and selectively igniting the discharge path of one of a plurality of gaseous trigger devices to indicate the value of the emission.

15. Apparatus for measuring the total emission characteristic of an electronic discharge device having a cathode and an anode, comprising an energizing source for said cathode, a high voltage low capacity condenser, a high potential source, a plurality of vacuum relays connected to said condenser, means for selectively operating one of said relays to charge said condenser from said high potential source and the other relay to discharge said condenser through the anode of said device, the applied voltage being such as to produce saturation in the discharge path of said device whereby a peak space current equal to the total emission of said cathode flows in the output of said device, a non-inductive low resistance in the output of said device through which said space current flows to develop a voltage drop, a low voltage condenser connected in shunt to said resistance, a gaseous rectifier coupled to said resistance having a cathode and anode, said cathode being energized from the source feeding the cathode of the device under test, a direct current milliammeter connected to said condenser, and a switch connected to said condenser for alternately connecting said condenser to said gaseous rectifier and to said milliammeter whereby the condenser is charged to the value of the voltage drop across said resistance and discharged through said meter to give a deflection proportional to the total emission generated by the cathode of the device under test.

EDMUND G. SHOWER.